US008684386B2

(12) United States Patent
Matthews et al.

(10) Patent No.: US 8,684,386 B2
(45) Date of Patent: Apr. 1, 2014

(54) HEAD TUBE ASSEMBLY FOR A BICYCLE WITH CABLE ACCESS ROUTING IN AN OPEN STEERER CONFIGURATION

(76) Inventors: Richard Peter Matthews, Peterborough (CA); Robert James Pike, Scarborough (CA)

(*) Notice: Subject to any disclaimer, the term of this patent is extended or adjusted under 35 U.S.C. 154(b) by 0 days.

(21) Appl. No.: 13/535,718

(22) Filed: Jun. 28, 2012

(65) Prior Publication Data

US 2013/0009379 A1     Jan. 10, 2013

Related U.S. Application Data

(60) Provisional application No. 61/504,285, filed on Jul. 4, 2011.

(51) Int. Cl.
*B62K 3/02*     (2006.01)

(52) U.S. Cl.
USPC ........... 280/279; 280/270; 280/276; 74/551.1

(58) Field of Classification Search
USPC .......................... 280/279, 270, 276; 74/551.1
See application file for complete search history.

(56) References Cited

U.S. PATENT DOCUMENTS

| | | | | |
|---|---|---|---|---|
| 6,416,071 B2* | 7/2002 | Marui | | 280/279 |
| 7,000,936 B2* | 2/2006 | Schmider | | 280/281.1 |
| 7,017,929 B2* | 3/2006 | Horiuchi | | 280/279 |
| 7,562,889 B2* | 7/2009 | Cauwet | | 280/276 |
| 7,854,442 B2* | 12/2010 | Onogi et al. | | 280/288.3 |
| 2005/0098979 A1* | 5/2005 | Horiuchi | | 280/279 |
| 2005/0258617 A1* | 11/2005 | Ueno et al. | | 280/280 |

FOREIGN PATENT DOCUMENTS

| | | |
|---|---|---|
| EP | 1529724 A1 | 5/2005 |
| EP | 1529725 A1 | 5/2005 |
| EP | 1787899 A1 | 5/2007 |
| FR | 2864938 A1 | 7/2005 |
| WO | WO2009/146552 A1 | 12/2009 |

* cited by examiner

*Primary Examiner* — Tashiana Adams
*Assistant Examiner* — Marlon Arce
(74) *Attorney, Agent, or Firm* — Bennett Jones LLP

(57) ABSTRACT

A head tube assembly suitable for a bicycle and comprising an open steerer configuration and cable routing. The head tube assembly comprises a head tube configured to connect with the top tube and down tube of the bicycle. The head tube includes a lower bearing component and an upper bearing component configured to rotatably engage the fork assembly. The fork assembly comprises an external steerer configured to rotate externally to the head tube. The head tube assembly includes an upper steerer section configured to secure the external steerer, and an internal chamber configured with an aperture for receiving one or more cables and being coupled to the top tube or the down tube. The internal chamber includes one or more guide tubes configured to route the cable(s) through the interior portion of the top tube or the down tube.

20 Claims, 2 Drawing Sheets

HEAD TUBE ASSEMBLY FOR A BICYCLE WITH CABLE ACCESS ROUTING IN AN OPEN STEERER CONFIGURATION

This application claims priority to U.S. Patent Application No. 61/504,285 filed Jul. 4, 2011, and entitled "HEAD TUBE ASSEMBLY FOR A BICYCLE WITH CABLE ACCESS ROUTING IN AN OPEN STEERER CONFIGURATION", which is incorporated herein in its entirety.

FIELD OF THE INVENTION

This invention relates to wheeled vehicles or cycles, and more particularly to a head tube assembly with an open steerer configuration with cable routing for a bicycle.

BACKGROUND OF THE INVENTION

Bicycle designers continue trying to reduce the aerodynamic drag of bicycles in order to increase riders speed and reduce rider fatigue. In addition to tube shapes, the routing of control cables can be changed to reduce their interaction with air flow against and around the bicycle and thereby reduce the effects of drag.

Attempts have been made in the art to reduce cable drag by routing one or more cables internally through the bicycle frame. Most known approaches involve providing a hole on the side of steerer tube between the upper and lower bearings and routing the cables through the hole into the steerer tube and running the cables in the interior of the bicycle frame and then out respective holes proximate to the components, each brakes, gear derailleur's. Difficulty with the internal routing of cables arises at assemblies or junctions that move or rotate, most notably, the head tube and steerer tube assembly. The known approaches have to deal with the rotation of the internally routed cables as the fork assembly is turned, with the steerer tube rotating relative to the stationary hole on the steerer tube. The cables routed through the hole can limit the motion of the steerer tube and can also be damaged by the hole as a result of over rotation. The cables will also tend to move inside the steerer tube as the steer tube is rotated, i.e. as the rider turns the bicycle by moving the handlebars.

Accordingly, there remains a need for improvement in the art.

BRIEF SUMMARY OF THE INVENTION

The present invention is directed to a head tube assembly with an open steerer configuration for a bicycle.

According to one embodiment, the present invention comprises a head tube assembly for use with a bicycle frame, the head tube assembly comprising a head tube configured for adjoining to a top tube and to a down tube in the bicycle frame; the head tube including a lower bearing component and an upper bearing component, the lower and upper bearings being configured for rotatably engaging a fork assembly, the fork assembly comprising an external steerer configured to rotate externally to the head tube; an upper steerer section configured to secure the external steerer; and an internal chamber configured with an aperture for receiving one or more cables, and the internal chamber being coupled to the top tube or to the down tube, and including one or more guide tubes configured to route the one or more cables through the interior section of the top tube or the down tube.

According to another embodiment, the present invention comprises a cycle frame comprising: a bottom bracket; a top tube, a head tube, a down tube and a seat tube; one end of the top tube and one end of the down tube being affixed to the head tube, and another end of the top tube being affixed to one end of the seat tube; first and second seat stays, and first and second chain stays, and one end of each of the seat stays being affixed to the seat tube, and another end of each of the seat stays being affixed to respective ends of the chain stays; another end of the down tube and another end of the seat tube and another end of each of the chain stays forming a juncture for connecting or affixing the bottom bracket; the head tube including a lower bearing component and an upper bearing component, the lower and upper bearing components being configured for rotatably engaging a fork assembly, the fork assembly comprising an external steerer configured to rotate externally to the head tube; an upper steerer section configured to secure the external steerer; and the head tube assembly including an internal chamber configured with an aperture for receiving one or more cables, the internal chamber being coupled to the top tube or to the down tube, and including one or more guide tubes configured to route the one or more cables through the interior section of the top tube or the down tube.

Other aspects and features of the present invention will become apparent to those ordinarily skilled in the art upon review of the following exemplary embodiments of the invention in conjunction with the accompanying figures.

BRIEF DESCRIPTION OF THE DRAWINGS

Reference will now be made to the accompanying drawings, which show by way of example, embodiments according to the present invention, and in which.

DETAILED DESCRIPTION OF THE EMBODIMENTS

Figure 1:
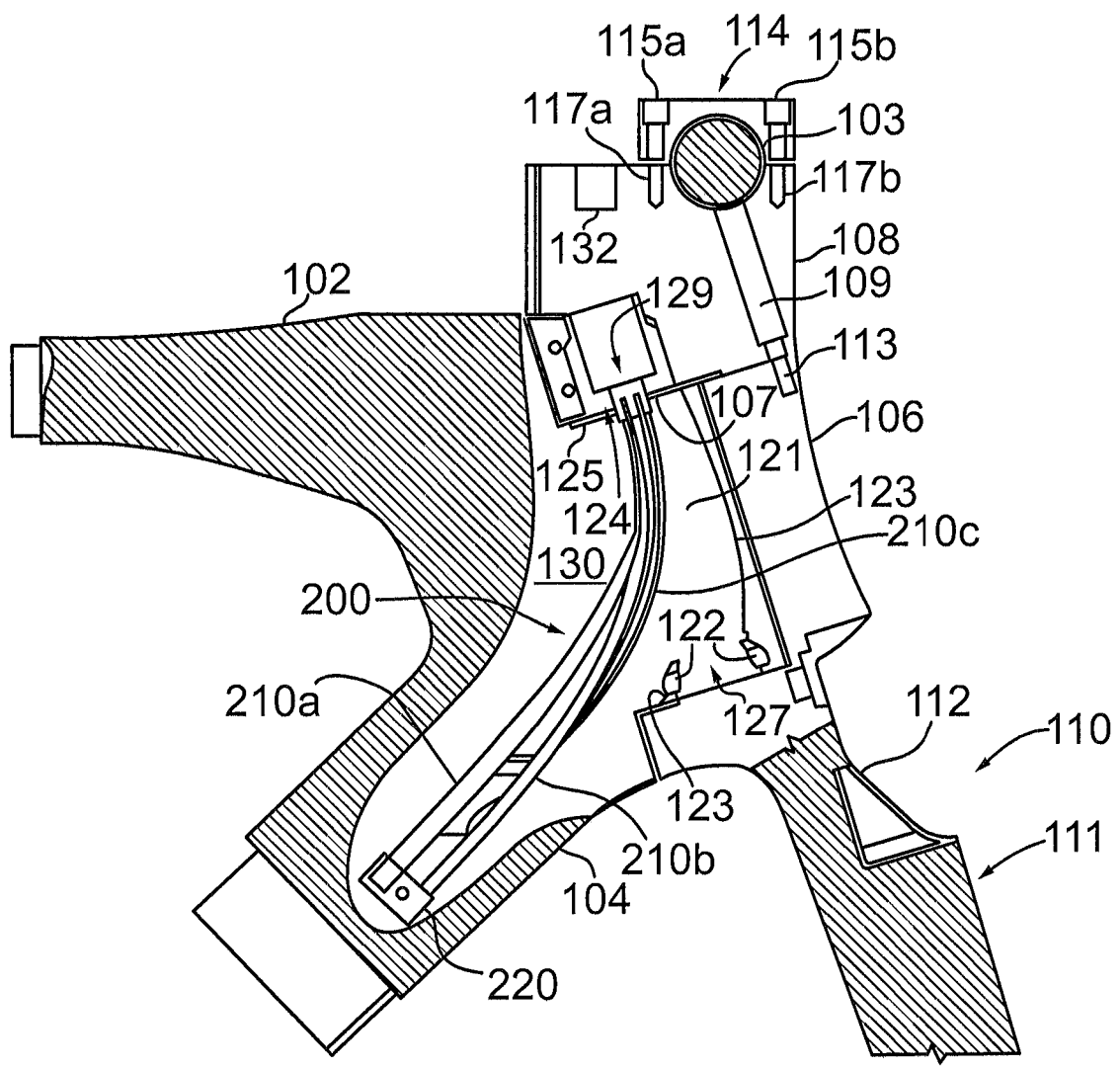
FIG. 1 shows a head tube assembly and fork for a bicycle with an open steerer configuration according to an embodiment of the present invention.

Reference is first made to FIG. 1, which shows a front section of a bicycle frame indicated generally by reference 100 with a head tube assembly and fork with an open steerer configuration according to an embodiment of the present invention and indicated generally by reference 120. In FIG. 1, the head tube section and fork assembly are shown in a partial cut-away or sectional view along a line that bisects the head tube assembly and the fork assembly. While embodiments according to the present invention are described in the context of a bicycle, it will be appreciated and understood that the invention may be suitable for other frame geometries or wheeled vehicle configurations with a rotatable head assembly.

The front section of bicycle frame 100 as depicted in FIG. 1 comprises a top tube 102 and a down tube 104. The top tube 102 is connected to the down tube 104 and a head tube 121 in the head tube assembly 120 using known techniques. As shown in FIG. 1, the front section of the bicycle frame 100 includes an external steerer tube indicated generally by reference 106 and an upper steerer section indicated generally by reference 108. The bicycle frame 100 also includes a fork assembly indicated generally by reference 110. The fork assembly 110 comprises a fork 111 and a fork head or crown 112. According to an embodiment, the fork head 112 is integrated or combined with the external steerer tube 106 wherein the head tube assembly 120 does not include a conventional internal steering tube or axle. The external steerer tube 106 can comprise an integrated component with the fork head 112 or a separate component that is connected or otherwise joined to the fork head 112. The fork head 112 is adjoined or otherwise affixed to the forks 111 in known manner, which are configured at their respective lower ends to receive the axle of the front wheel. According to an embodiment, the head tube assembly 120 comprises a head tube indicated generally by reference 121, which is affixed or otherwise connected to the respective ends of the top tube 102 and the down tube 104.

As depicted in FIG. 1, the head tube assembly 120 (i.e. the head tube 121) is configured with a lower bearing component 122 and an upper bearing component 124. The head tube bearings 122, 124 are held in place with respective tabs 123 and 125. The head tube bearings 122, 124 can also be held in place using indents, races or other types of guides or holders incorporated into the head tube 120 and/or fork assembly 110. According to exemplary implementation, the external steerer tube 106 includes a bearing plate or tab or flange indicated generally by reference 107. The bearing flange 107 is configured to rotatably couple or engage the external steerer tube 106 to the upper head tube bearing 124, for example, with a matching bearing race or bearing cup, and according to one implementation is further secured by the upper steerer section 108. According to another embodiment or exemplary implementation, a second bearing flange or tab is provided for rotatably engaging the lower bearing component 122.

As shown in FIG. 1, the upper steerer section 108 is connected or clamped to the fork head 112 using a bolt or other type of threaded fastener indicated generally by reference 109 which is screwed into a threaded socket 113 in the fork head 112. As also shown in FIG. 1, the upper steerer section 108 is configured to receive a handle bar clamp indicated generally by reference 114. The handle bar clamp 114 is clamped or attached to upper steerer section 108 with one or more bolts or threaded fasteners 115a, 115b that are screwed into threaded sockets 117a, 117b in the upper steerer section 108. The handle bar clamp 114 securely clamps a handle bar 102.

According to another aspect, the head tube 121 has a curvature on the outside surface indicated generally by reference 123. The curvature 123 provides some clearance between the head tube 121 and the fork head or crown 112 when the upper steering section 108 and fork assembly 110 are turned by rotating the handlebars 102.

As described above, the upper steerer section 108 is removable. To assemble the head tube assembly 120 and the fork assembly 110 according to an exemplary implementation, the fork head crown 112 is inserted into the lower end of the head tube 121 and coupled or mated (i.e. with a mating bearing cup, bearing race or other engageable coupler) with the lower bearing 122 in the head tube 121 and then the external steerer tube 106 is coupled to the upper bearing 124, with the bearing flange 107 (and a mating bearing cup or race), and the upper steerer section 108 is attached to secure the assembly.

Figure 2:
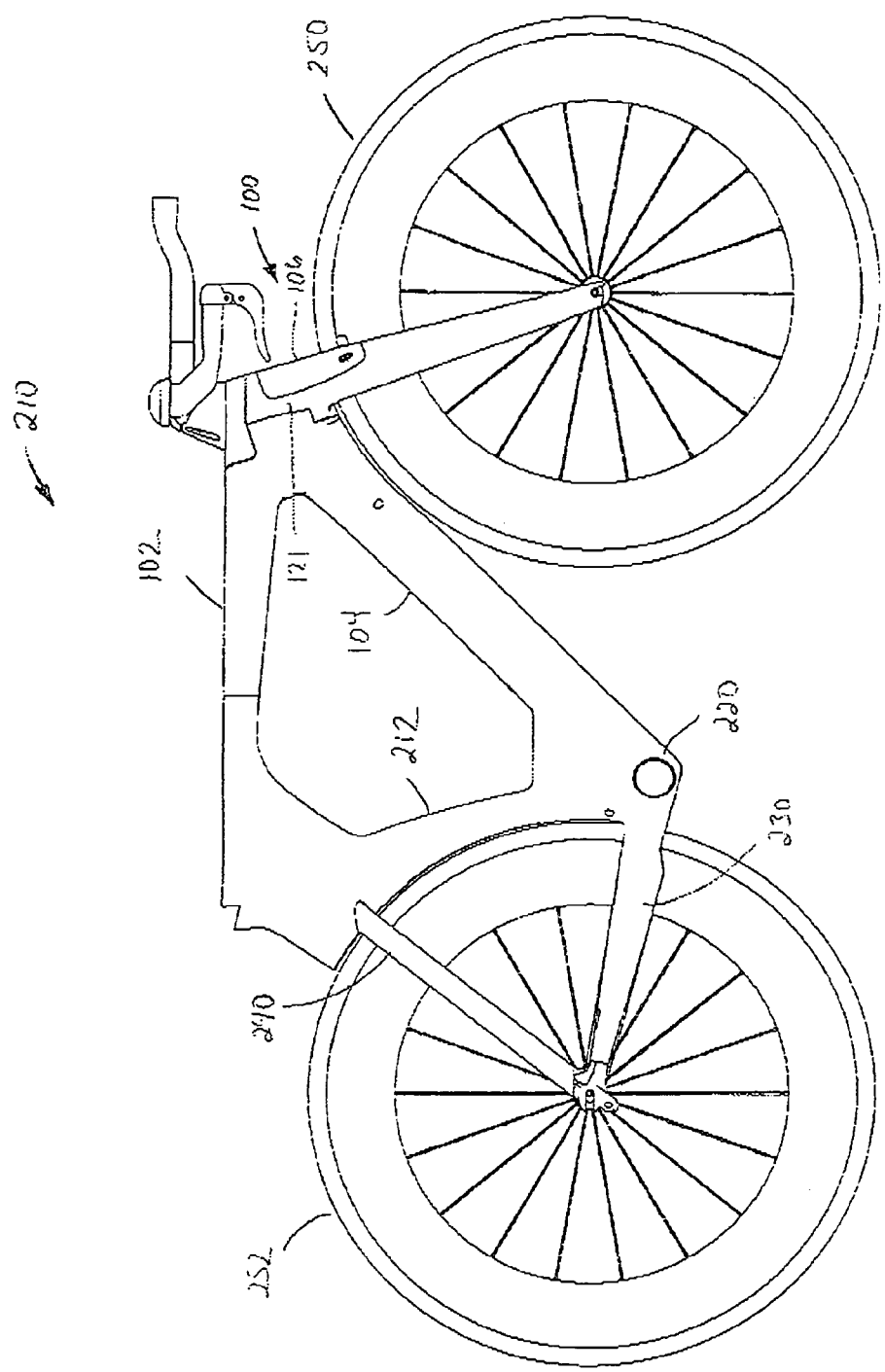
FIG. 2 shows a bicycle frame with an open steerer configuration according to an embodiment of the present invention.

In known manner and as shown in FIG. 2, a complete bicycle frame 210 is assembled by connecting the other end of the top tube 102 to a seat tube 212. The other end of the seat tube 212 is connected or affixed to the other end of the down tube 104 and to a bottom bracket assembly 220. The bottom bracket assembly 220 is configured to receive a pedal crank assembly (not shown). The bicycle frame 210 further comprises a pair of chain stays 230 and a pair of seat stays 240. The tube and frame components for the bicycle frame 210 are affixed or adjoined using known techniques, such as welding or detachable fasteners, etc., to form the complete bicycle frame 210, as will be familiar to one skilled in the art. The bicycle frame 210 is completed with the head tube and fork assembly 100 as described above, front and rear wheels 250, 252, and a component set (e.g. gears, derailleur's, brakes, etc. not shown).

Reference is made back to FIG. 1. The configuration of the head tube assembly 120 according to an embodiment of the present invention provides an internal chamber or cavity inside the head tube assembly 120. The internal chamber or cavity inside the head tube assembly 120 is indicated generally by reference 130. In accordance with the embodiment, the steerer tube or axle is eliminated from the head tube assembly 120, and the internal chamber 130 comprises an unobstructed cavity and is unimpeded by any rotating steering mechanism shafts or tubes as found in conventional bicycle designs. This configuration substantially eliminates interference between the steering mechanism and internal routing of cables and wires. In this way, cables (e.g. braking cables, gear shifter cables, computer and other sensor cables) are easily routed within the head tube assembly 120 without interference from the steerer tube or axle. As shown in FIG. 1, the upper steerer section 108 includes a hole or aperture indicated generally by reference 132 for routing cables into and out from the internal chamber 130 and the other tubes forming the bicycle frame. As also shown, the upper and lower bearings 124 and 122 have an open bore or void indicated by references 129 and 127, respectively. The open bore 129 in the upper bearing 124 allows cables, tubes and/or wires, to be routed from the upper steerer section 108 (i.e. through the hole 132) into the internal chamber 130 and then further down through the down tube 104, for example, to the pedal crank assembly, front and/or rear derailleur's, and/or rear brake components, or to other sections of the frame or bicycle. Similarly, the open bore 127 through the lower bearing 122 allows cable(s), tubes and/or wires, to be routed from/to the upper steerer section 108 and through the fork 111 to components configured with the front wheel, for example, front brake cable(s), computer speed or other sensor cable(s).

According to another embodiment, the hole 132 may be located in other sections or portions of the head tube assembly 120 that are adjacent to, or in communication with, the internal chamber 130. According to another aspect, more than one hole, slot or aperture can be provided for routing cables or wires into and out from the internal chamber 130 and the interior of the tubes forming the bicycle frame.

According to embodiment, the head tube assembly 120 is configured with one or more guide tubes indicated generally by reference 210. The guide tubes are configured to receive a cable, wire, or other control line or actuator, or computer sensor cable or the like, indicated individually by references 210a, 210b and 210c in FIG. 1.

As shown in FIG. 1 and according to an embodiment, the guide tubes 210 are configured to extend from the upper bearing 124 down through the internal chamber 130 in the head tube assembly 120 and into the down tube 104. The guide tubes 210 are held in place into the down tube with cable clip or similar fastener indicated by reference 220. The guide tubes 210 are held in place in the upper bearing 124 with an insert 230 that is configured to be inserted into the opening or bore of the upper bearing 124. The insert 230 can be made of a plastic material or an elastomer or similar material that is drilled or formed with a hole for each of the guide tubes 210 to be inserted and passed through the insert 230. According to this exemplary implementation, the insert 230 with the guide tubes 210 is positioned approximately below the hole or aperture 132 in the upper steering section 108. This arrangement provides the capability to route control cables mounted or located with their respective actuators on the handlebars and/or headstock, such as, a rear brake cable through the guide tube 210a, a front derailleur control cable through the guide 210b, a rear derailleur control cable through the guide 210c. The insert 230 can include additional holes and/or guide tubes for routing a front brake cable to the front brake through the fork assembly 110, and a computer sensor cable to the axle of the front wheel. According to this aspect, the guide tubes 210 extend through the bore or opening in the lower bearing 122. According to a further aspect, the lower bearing 122 can be configured with a second insert 232 to secure and/or position the lower ends of the guide tubes 210 extending into the fork assembly 110.

According to another embodiment, the guide tubes 210 can be configured to extend through substantially the length of the down tube 104 and/or fork assembly 110. According to this embodiment, the guide tubes 210 can be pre-installed during the manufacture of the tubes, or during post-manufacture as part of assembly.

According to an embodiment, the guide tubes 210 are made or manufactured from a semi-rigid material or composite material, for example, plastic, glass fiber reinforced plastic or carbon fibre reinforced plastic. According another embodiment, the guide tubes 210 are manufactured from a rigid material, for example, aluminum alloy, stainless steel, titanium or other metal alloys.

In summary and according to an embodiment, there is provided a head tube assembly for use with a bicycle frame, said head tube assembly comprising a head tube configured for adjoining to a top tube and to a down tube in the bicycle frame; said head tube including a lower bearing component and an upper bearing component, said lower and upper bearings being configured for rotatably engaging a fork assembly, said fork assembly comprising an external steerer configured to rotate externally to said head tube; an upper steerer section configured to secure said external steerer; and an internal chamber configured with an aperture for receiving one or more cables, and said internal chamber being coupled to said top tube or to said down tube, and including one or more guide tubes configured to route the one or more cables through the interior section of the top tube or the down tube.

In summary and according to another embodiment, there is provided a cycle frame comprising: a bottom bracket; a top tube, a head assembly, a down tube and a seat tube; one end of said top tube and one end of said down tube being affixed to said head tube, and another end of said top tube being affixed to one end of said seat tube; first and second seat stays, and first and second chain stays, and one end of each of said seat stays being affixed to said seat tube, and another end of each of said seat stays being affixed to respective ends of said chain stays; another end of said down tube and another end of said seat tube and another end of each of said chain stays forming a juncture for connecting to said bottom bracket; and said head tube assembly comprising said head tube including a lower bearing component and an upper bearing component, said lower and upper bearings being configured for rotatably engaging a fork assembly, said fork assembly comprising an external steerer configured to rotate externally to said head tube; an upper steerer section configured to secure said external steerer; and said head tube assembly including an internal chamber configured with an aperture for receiving one or more cables, and said internal chamber being coupled to said top tube or to said down tube, and including one or more guide tubes configured to route the one or more cables through the interior section of the top tube or the down tube.

The present invention may be embodied in other specific forms without departing from its spirit or essential characteristics. The embodiments described and disclosed are to be considered in all aspects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A head tube assembly for use with a bicycle frame, said head tube assembly comprising:
   a head tube configured for adjoining to a top tube and to a down tube in the bicycle frame;
   said head tube including a lower bearing component and an upper bearing component, said lower and upper bearings being configured for rotatably engaging a fork assembly, said fork assembly comprising an external steerer tube, and including a first bearing tab to rotatably couple said external steerer tube with said upper bearing and in a position adjacent to an outside surface of said head tube, and a second bearing tab to rotatably couple said external steerer tube with said lower bearing and in a position adjacent to the outside surface of said head tube, and said external steerer tube being configured to rotate externally and around the outside surface of said head tube;
   an upper steerer section configured to secure said external steerer; and
   an internal chamber configured inside said head tube and comprising an aperture for receiving one or more cables, and said internal chamber being coupled to said top tube or to said down tube, and including one or more guide tubes configured to route said one or more cables through an interior section of the top tube or the down tube.

2. The head tube assembly as claimed in claim 1, wherein said upper bearing component includes an insert configured for positioning said one or more guide tubes inside said internal chamber.

3. The head tube assembly as claimed in claim 2, further including a clip attached to an interior section of said down tube and configured to secure the other ends of said one or more guide tubes.

4. The head tube assembly as claimed in claim 2, wherein one of said one or more guide tubes comprises a guide tube for receiving and guiding a front derailleur cable.

5. The head tube assembly as claimed in claim 2, wherein one of said one or more guide tubes comprises a guide tube for receiving and guiding a rear derailleur cable.

6. The head tube assembly as claimed in claim 2, wherein one of said one or more guide tubes comprises a guide tube for receiving and guiding a rear brake cable.

7. The head tube assembly as claimed in claim 1, wherein said lower bearing component includes an insert configured for positioning said one or more guide tubes inside said internal chamber and into said fork assembly.

8. The head tube assembly as claimed in claim 7, wherein one of said one or more guide tubes comprises a guide tube for receiving and guiding a front brake cable.

9. The head tube assembly as claimed in claim 7, wherein one of said one or more guide tubes comprises a guide tube for receiving and guiding a computer sensor cable.

10. The head tube assembly as claimed in claim 2, wherein one of said one or more guide tubes comprises a guide tube for receiving and guiding a hydraulic actuation line.

11. A cycle frame comprising:
   a bottom bracket;
   a top tube, a head tube assembly comprising a head tube, a down tube and a seat tube;
   one end of said top tube and one end of said down tube being affixed to said head tube, and another end of said top tube being affixed to one end of said seat tube;

first and second seat stays, and first and second chain stays, and one end of each of said seat stays being affixed to said seat tube, and another end of each of said seat stays being affixed to respective ends of said chain stays;

another end of said down tube and another end of said seat tube and another end of each of said chain stays forming a juncture for connecting to said bottom bracket; and said head tube including a lower bearing component and an upper bearing component, said lower and upper bearings being configured for rotatably engaging a fork assembly, said fork assembly comprising an external steerer tube configured to rotate externally to an outside surface of said head tube;

an upper steerer section configured to secure said external steerer; and said head tube assembly including an internal chamber configured inside said head tube and comprising an aperture for receiving one or more cables, and said internal chamber being coupled to said top tube or to said down tube, and including one or more guide tubes configured to route said one or more cables through an interior section of said top tube or said down tube.

12. The cycle frame as claimed in claim 11, wherein said one or more guide tubes comprise a semi-rigid material and said one or more guide tubes being configured to run through an opening in said upper bearing component.

13. The cycle frame as claimed in claim 12, further including a clip attached to an interior section of said down tube and configured to secure the other ends of said one or more guide tubes.

14. The cycle frame as claimed in claim 11, wherein one of said one or more guide tubes comprises a guide tube for receiving and guiding a front derailleur cable.

15. The cycle frame as claimed in claim 11, wherein one of said one or more guide tubes comprises a guide tube for receiving and guiding a rear derailleur cable.

16. The cycle frame as claimed in claim 11, wherein one of said one or more guide tubes comprises a guide tube for receiving and guiding a rear brake cable.

17. The cycle frame as claimed in claim 11, wherein said one or more guide tubes comprise a semi-rigid material and said one or more guide tubes configured to run through an opening in said lower bearing component and extend into said fork assembly.

18. The cycle frame as claimed in claim 17, wherein one of said one or more guide tubes comprises a guide tube for receiving and guiding a front brake cable.

19. A cycle frame comprising:

a bottom bracket;

a top tube, a head tube assembly comprising a head tube, a down tube and a seat tube;

one end of said top tube and one end of said down tube being affixed to said head tube, and another end of said top tube being affixed to one end of said seat tube;

first and second seat stays, and first and second chain stays, and one end of each of said seat stays being affixed to said seat tube, and another end of each of said seat stays being affixed to respective ends of said chain stays;

another end of said down tube and another end of said seat tube and another end of each of said chain stays forming a juncture for connecting to said bottom bracket; and said head tube including a lower bearing component and an upper bearing component, said lower and upper bearings being configured for rotatably engaging a fork assembly, said fork assembly comprising an external steerer tube configured to rotate externally to an outside surface of said head rube;

an upper steerer section configured to secure said external steerer; and said head tube assembly including an internal chamber configured inside said head tube and comprising an aperture for receiving one or more cables, and said internal chamber being coupled to said top tube or to said down tube for routing one or more cables through the interior section of said top tube or said down tube.

20. The cycle frame as claimed in claim 19, wherein said internal chamber includes one or more guide tubes configured to route said one or more cables.

* * * * *